United States Patent
Yang et al.

(10) Patent No.: US 9,300,199 B2
(45) Date of Patent: Mar. 29, 2016

(54) UNDER-VOLTAGE PROTECTION CIRCUIT FOR PROGRAMMABLE POWER SUPPLIES

(71) Applicant: SYSTEM GENERAL CORPORATION, New Taipei (TW)

(72) Inventors: Ta-Yung Yang, Milpitas, CA (US); Jian-Ming Fu, Taichung (TW); Ju-Hyun Kim, Siheung (KR); Chi-Yin Lo, Kaohsiung (TW)

(73) Assignee: SYSTEM GENERAL CORPORATION, New Taipei (TW)

( * ) Notice: Subject to any disclaimer, the term of this patent is extended or adjusted under 35 U.S.C. 154(b) by 29 days.

(21) Appl. No.: 14/466,110

(22) Filed: Aug. 22, 2014

(65) Prior Publication Data
US 2015/0138853 A1    May 21, 2015

Related U.S. Application Data

(60) Provisional application No. 61/905,386, filed on Nov. 18, 2013.

(51) Int. Cl.
| H02M 1/34 | (2007.01) |
| H02M 1/32 | (2007.01) |
| H02M 3/335 | (2006.01) |
| H02M 1/00 | (2007.01) |
| H02J 7/00 | (2006.01) |

(52) U.S. Cl.
CPC ............ *H02M 1/32* (2013.01); *H02M 3/33523* (2013.01); *H02J 7/0031* (2013.01); *H02J 2007/0037* (2013.01); *H02J 2007/0059* (2013.01); *H02M 2001/0009* (2013.01); *H02M 2001/0025* (2013.01)

(58) Field of Classification Search
CPC ..... H02M 1/32; H02M 1/34; H02M 3/33507; H02M 3/33523; H02M 7/48; H02M 7/1227; H02M 7/5387
USPC ............... 363/55, 56.01, 56.03, 56.05, 95, 97
See application file for complete search history.

(56) References Cited

U.S. PATENT DOCUMENTS

| 4,524,412 A * | 6/1985 | Eng ..................... H02M 3/3387 323/285 |
| 6,456,511 B1 * | 9/2002 | Wong ..................... H02M 1/36 363/21.13 |
| 7,253,589 B1 * | 8/2007 | Potanin ................. H02J 7/0055 307/80 |
| 9,041,378 B1 * | 5/2015 | Lam ...................... H02M 3/156 323/271 |
| 2005/0134220 A1 * | 6/2005 | Brohlin ................. H02J 7/0072 320/128 |
| 2005/0168193 A1 * | 8/2005 | Xiong ................... H02J 7/0029 320/134 |
| 2006/0279266 A1 * | 12/2006 | Currell ................. H02M 3/156 323/282 |
| 2008/0084712 A1 * | 4/2008 | Wang ..................... H02M 1/32 363/21.01 |

(Continued)

*Primary Examiner* — Adolf Berhane
(74) *Attorney, Agent, or Firm* — McClure, Qualey & Rodack, LLP

(57) ABSTRACT

A control circuit of a power supply is provided. The power supply includes a current-sense circuit, a voltage-sense circuit, an output voltage regulation circuit, and a current regulation circuit. The current-sense circuit generates a current-sense signal in response to an output current of the power supply. The voltage-sense circuit generates a voltage-sense signal in response to an output voltage of the power supply. The output voltage regulation circuit is coupled to regulate the output voltage of the power supply according to a voltage reference signal and the voltage-sense signal. The output current regulation circuit is coupled to regulate the output current of the power supply according to a current reference signal and the current-sense signal. The output voltage of said power supply is programmable.

13 Claims, 3 Drawing Sheets

(56) References Cited

U.S. PATENT DOCUMENTS

2011/0266969 A1* 11/2011 Ludorf ............... H02M 1/4258
                                                                    315/294
2012/0205974 A1* 8/2012 McCaslin ............... H02J 3/385
                                                                    307/18
2014/0140109 A1* 5/2014 Valley ................. H02M 1/4258
                                                                    363/21.17

* cited by examiner

UNDER-VOLTAGE PROTECTION CIRCUIT FOR PROGRAMMABLE POWER SUPPLIES

CROSS REFERENCE TO RELATED APPLICATIONS

This application claims the benefit of U.S. Provisional Application No. 61/905,386, filed on Nov. 18, 2013, the contents of which are incorporated herein by reference.

BACKGROUND OF THE INVENTION

1. Field of the Invention

The present invention relates to a programmable power converter, and, more particularly, the present invention relates to an under-voltage protection circuit for programmable power supplies.

2. Description of the Related Art

Programmable power supplies are developed to provide different constant output voltage levels, such as 5 V, 9 V, 12 V, and 19 V, to power different equipments. Some of them having constant output current characteristic are called chargers which are used to charge batteries. An output current usually has a current limit to ensure that the batteries can be charged under or equal to a safe current that won't damage the batteries.

FIG. 2 shows a characteristic curve of an output voltage $V_O$ versus an output current $I_O$ for a traditional power supply with constant output current and constant output voltage characteristic. When the output current $I_O$ demanded by the output load of the power supply reaches a threshold current $I_T$, the output voltage $V_O$ will start to decrease automatically to keep the output current $I_O$ as a constant. In a case, the threshold current $I_T$ is the maximum value of the characteristic curve. However, as the output voltage $V_O$ drops to a too low level, the batteries, especially to lithium batteries, would be damaged permanently due to its over discharging.

BRIEF SUMMARY OF THE INVENTION

Thus, an alert mechanism (under-voltage protection circuit) is needed for programmable power supplies to protect their output loads, especially for batteries.

An exemplary embodiment of control circuit of a power supply is provided. The control circuit comprises a current-sense circuit, a voltage-sense circuit, an output voltage regulation circuit, a current regulation circuit, and a time-delay circuit. The current-sense circuit generates a current-sense signal in response to an output current of the power supply. The voltage-sense circuit generates a voltage-sense signal in response to an output voltage of the power supply. The output voltage regulation circuit is coupled to regulate the output voltage of the power supply according to a voltage reference signal and the voltage-sense signal. The output current regulation circuit is coupled to regulate the output current of the power supply according to a current reference signal and the current-sense signal. The current reference signal is changed in response to a level of the output voltage of the power supply. The output current of the power supply is decreased in response to a decrement of the current reference signal. The time-delay circuit is coupled to the output current regulation circuit for changing the current reference signal. A level of the current reference signal is decreased in response to a decrement of the level of the output voltage of the power supply. The output voltage of the power supply is programmable. A level of the current reference signal is decreased once the output voltage is lower than a protection threshold. A level of the protection threshold is decreased in response to a decrement of the voltage reference signal.

An exemplary embodiment of a method of regulating a power supply. The method comprises: generating a current-sense signal in response to an output current of the power supply; generating a voltage-sense signal in response to an output voltage of the power supply; regulating the output voltage in response to a voltage reference signal and the voltage-sense signal; regulating the output current in response to a current reference signal and the current-sense signal; and generating a delay time to change the current reference signal. The current reference signal is changed in response to the output voltage of the power supply. The output current is decreased in response to a decrement of the current reference signal. A level of the current reference signal is decreased in response to a decrement of the output voltage of the power supply. The output voltage of the power supply is programmable. A level of the current reference signal is decreased once the output voltage is lower than a protection threshold. A level of the protection threshold is decreased in response to a decrement of the voltage reference signal.

An exemplary embodiment a method of under-voltage protection for a power supply. The method comprises: regulating an output voltage of the power supply at a regulated level; regulating an output current of the power supply approximately at a first current level whenever the output voltage is below the regulated level and higher than a lower limit of a protection threshold; and regulating the output current of the power supply approximately at a second current level whenever the output voltage is below an upper limit of the protection threshold. The output voltage of the power supply is programmable. The first current level is higher than the second current level. The upper limit of the protection threshold is higher than the lower limit of the protection threshold.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
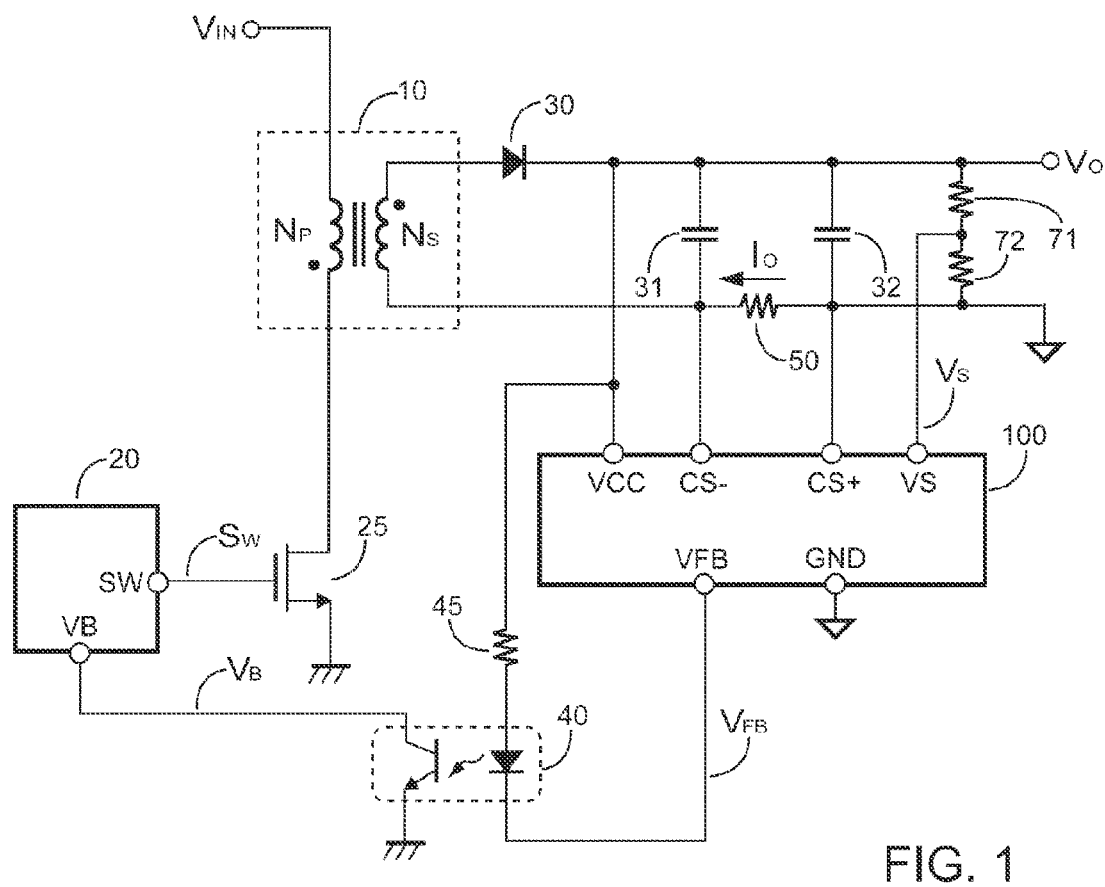
FIG. 1 shows an exemplary embodiment of a programmable power supply according to the present invention.
Figure 2:
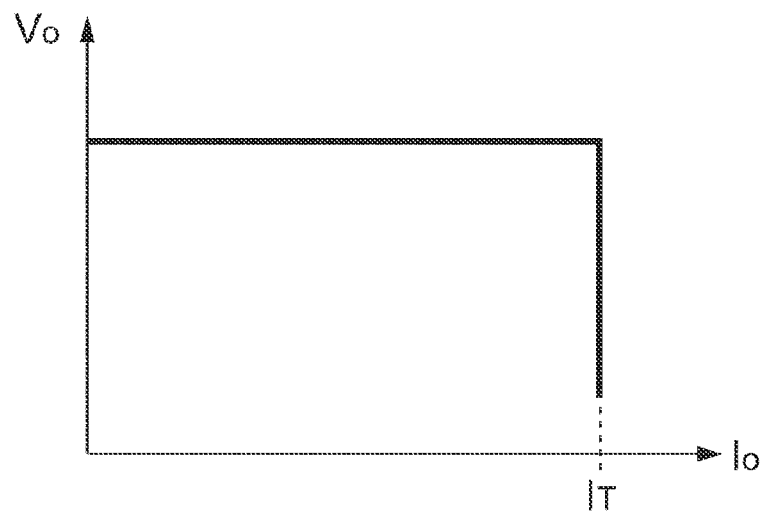
FIG. 2 shows a characteristic curve of an output voltage versus an output current for a traditional power supply with constant output current.

FIG. 1 shows an embodiment of a programmable power supply according to the present invention. A transformer 10 is coupled to receive an input voltage $V_{IN}$ of a power supply. A transistor 25 is coupled to switch a primary winding $N_P$ of the transformer 10. A pulse width modulation (PWM) circuit 20 generates a switching signal $S_W$ coupled to drive the transistor 25 for regulating an output voltage $V_O$ and an output current $I_O$ of the power supply. A secondary winding $N_S$ of the transformer 10 will generate the output voltage $V_O$ and the output current $I_O$ through a rectifier 30 and capacitors 31 and 32. A voltage-sense circuit formed by resistors 71 and 72 generate a voltage-sense signal $V_S$ in response to the output voltage $V_O$. A resistor 50 generates a differential current signal pair CS+ and CS− in response to the output current $I_O$. A control circuit 100 is coupled to receive the voltage-sense signal $V_S$ and the differential current signal pair CS+ and CS−. The control circuit 100 has a voltage reference signal $V_{RV}$ and a current reference signal $V_{RI}$ (shown in FIG. 3) for generating a feedback signal $V_{FB}$ in response to the voltage-sense signal $V_S$ and the differential current signal pair CS+ and CS−. The feedback signal $V_{FB}$ is further coupled to the PWM circuit 20 through an opto-coupler 40 to form a feedback loop. Therefore, the PWM circuit 20 generates the switching signal $S_W$ in response to the feedback signal $V_{FB}$ to regulate the output voltage $V_O$ and the output current $I_O$ as shown in equation (1) and equation (2).

$$V_O = \frac{R_{71} + R_{72}}{R_{72}} \times V_{RV} \quad (1)$$

$$I_O = \frac{K}{R_{50}} \times V_{RI} \quad (2)$$

where $R_{50}$, $R_{71}$, and $R_{72}$ are the resistance of the resistors 50, 71, and 72 respectively. K is a constant determined by the gain of a differential amplifier in the control circuit 100.

Figure 3:
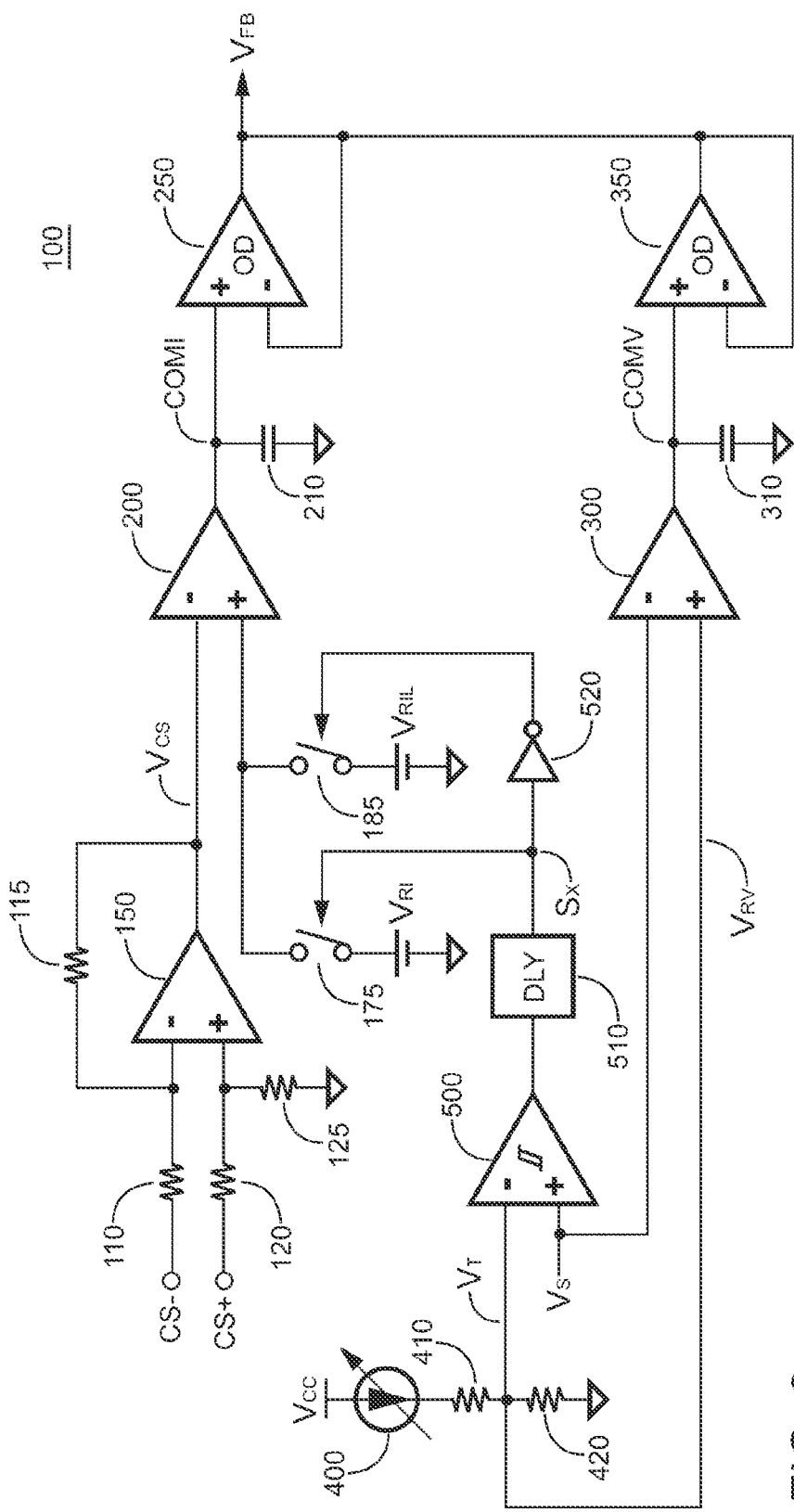
FIG. 3 shows an exemplary embodiment of a control circuit of a programmable power supply according to the present invention.

FIG. 3 shows an embodiment of the control circuit 100 according to the present invention. An amplifier 150 and resistors 110, 115, 120, and 125 develop a differential amplifier (current-sense circuit) coupled to receive the differential current signal pair CS+ and CS− for generating an current-sense signal $V_{CS}$. The ratio of the resistors 110 and 115 and the resistors 120 and 125 determine the value of the constant K (the gain of the differential amplifier). An error amplifier (output current regulation circuit) 200 receives the current-sense signal $V_{CS}$ to generate a current-feedback signal COMI according to the current reference signal $V_{RI}$ and the current-sense signal $V_{CS}$. The current reference signal $V_{RI}$ is coupled to the error amplifier 200 via a switch 175. An error amplifier (output voltage regulation circuit) 300 receives the voltage-sense signal $V_S$ to generate a voltage-feedback signal COMV according to the voltage reference signal $V_{RV}$ and voltage-sense signal $V_S$. The voltage-feedback signal COMV is coupled to generate the feedback signal $V_{FB}$ through an open-drain buffer (OD) 350. The current-feedback signal COMI is further coupled to generate the feedback signal $V_{FB}$ through an open-drain buffer (OD) 250. Therefore, the level of the feedback signal $V_{FB}$ is determined by the level of the voltage-feedback signal COMV and the level of the current-feedback signal COMI.

The voltage reference signal $V_{RV}$ is programmed by a programmable current source 400 and resistors 410 and 420. The value of the programmable current source 400 determines the level of the voltage reference signal $V_{RV}$. The voltage reference signal $V_{RV}$ therefore determines the output voltage $V_O$ according to equation (1) as aforementioned. The programmable current source 400 and the resistor 420 further generate a threshold $V_T$. The level of the threshold $V_T$ is lower than the level of the voltage reference signal $V_{RV}$. A comparator 500 having a hysteresis will generate a control signal $S_X$ through a time-delay circuit (DLY) 510 when the voltage-sense signal $V_S$ is higher than the threshold $V_T$. The control signal $S_X$ is coupled to control the switch 175. The control signal $S_X$ is further coupled to control a switch 185 via an inverter 520. Once the voltage-sense signal $V_S$ is lower than the threshold $V_T$, the switch 185 will be turned on and another current reference signal $V_{RIL}$ will be coupled to the error amplifier 200 to regulate the output current $I_O$. Thus, the current reference signals $V_{RI}$ or $V_{RIL}$ is changed actively in response to the level of the output voltage $V_O$. In detailed, the level of the active current reference signal $V_{RI}$ or $V_{RIL}$ is decreased in response to the decrement of the level of the output voltage $V_O$. The level of the current reference signal $V_{RIL}$ is lower than the level of the current reference signal $V_{RI}$. Therefore, the output current $I_O$ will be regulated as a lower value when the voltage-sense signal $V_S$ is lower than the threshold $V_T$. In other words, the output current $I_O$ is decreased in response to a decreased current reference signal, that is the lower current reference signal $V_{RIL}$.

Figure 4:
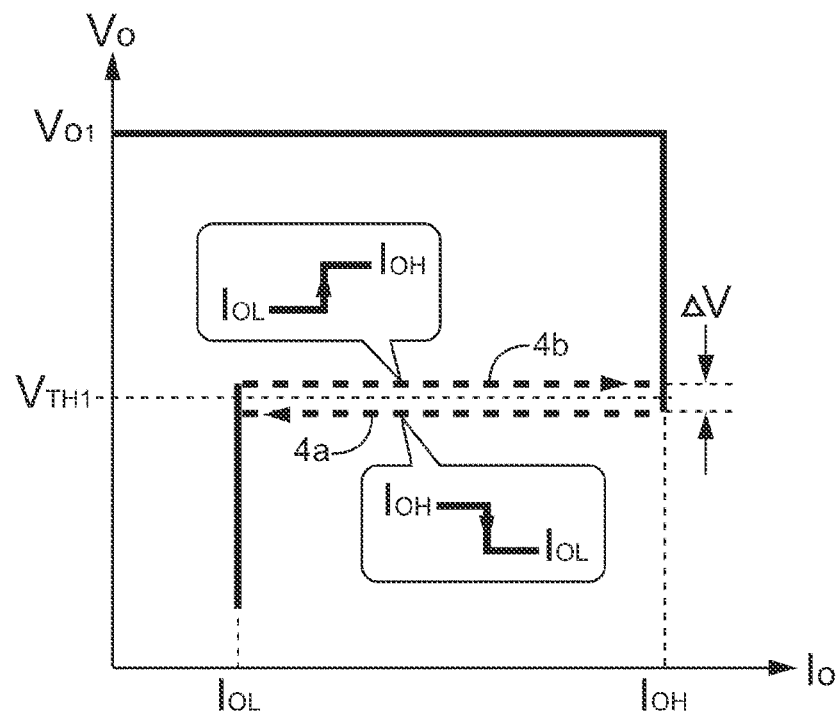
FIG. 4 shows one characteristic curve of an output voltage versus an output current according to the present invention.

FIG. 4 shows one characteristic curve of the output voltage $V_O$ having a first level $V_{O1}$ versus the output current $I_O$ according to the present invention. When the output voltage $V_O$ is programmed to regulate at the first level $V_{O1}$, a first protection threshold $V_{TH1}$ is correspondingly set by the threshold $V_T$. An upper limit 4b and a lower limit 4a forming a hysteresis range $\Delta V$ of the first protection threshold $V_{TH1}$ is determined by the hysteresis of the comparator 500. A first current level $I_{OH}$ of the output current $I_O$ is determined by the current reference signal $V_{RI}$. A second current level $I_{OL}$ of the output current $I_O$ is determined by the current reference signal $V_{RIL}$. The first level $I_{OH}$ is higher than the second level $I_{OL}$. As the output voltage $V_O$ falls below the lower limit 4a of the first protection threshold $V_{TH1}$, the output current $I_O$ being regulated will instantly fall to the second current level $I_{OL}$ from the first current level $I_{OH}$. As the output voltage $V_O$ raises above the upper limit 4b of the first protection threshold $V_{TH1}$, the output current $I_O$ being regulated will instantly raise to the first current level $I_{OH}$ from the second current level $I_{OL}$.

Figure 5:
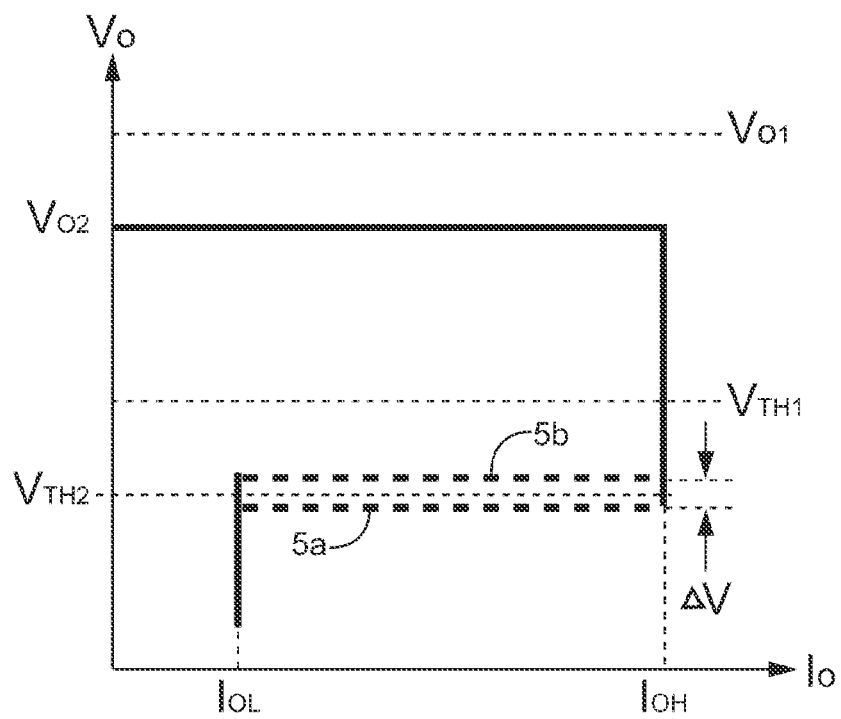
FIG. 5 shows another characteristic curve of the output voltage versus the output current according to the present invention.

FIG. 5 shows another characteristic curve of the output voltage $V_O$ having a second level $V_{O2}$ versus the output current $I_O$ according to the present invention. The whole characteristic curve in FIG. 5 is shifted downward corresponding to the characteristic curve shown in FIG. 4. When the output voltage $V_O$ is programmed to regulate at the second level $V_{O2}$, a second protection threshold $V_{TH2}$ having the hysteresis range $\Delta V$ formed between an upper limit 5b and a lower limit 5a will be correspondingly set.

Referring to both FIG. 4 and FIG. 5, the first level $V_{O1}$ is higher than the second level $V_{O2}$. The first protection threshold $V_{TH1}$ is higher than the second protection threshold $V_{TH2}$.

Referring to FIG. 4, in another perspective of the present invention, a method of under-voltage protection for a programmable power supply is also proposed. The method comprises: regulating an output voltage $V_O$ of the programmable power supply at a regulated level $V_{O1}$; regulating an output current $I_O$ of the programmable power supply approximately at a first current level $I_{OH}$ whenever the output voltage $V_O$ is below the regulated level $V_{O1}$ and higher than a lower limit 4a of a protection threshold $V_{TH1}$; and regulating the output current $I_O$ of the programmable power supply approximately at a second current level $I_{OL}$ whenever the output voltage $V_O$ is below an upper limit 4b of the protection threshold $V_{TH1}$. The first current level $I_{OH}$ is higher than the second current level $I_{OL}$. The upper limit 4b of the protection threshold $V_{TH1}$ is higher than the lower limit 4a of the protection threshold $V_{TH1}$.

Referring to FIG. 5, in another perspective of the present invention, the method described in last paragraph also comprises: regulating the output voltage $V_O$ of the programmable power supply at a regulated level $V_{O2}$; regulating the output current $I_O$ of the programmable power supply approximately at the first current level $I_{OH}$ whenever the output voltage $V_O$ is below the regulated level $V_{O2}$ and higher than a lower limit 5a of a protection threshold $V_{TH2}$; and regulating the output current $I_O$ of the programmable power supply approximately at the second current level $I_{OL}$ whenever the output voltage $V_O$ is below an upper limit 5b of the protection threshold $V_{TH2}$. The upper limit 5b of the protection threshold $V_{TH2}$ is higher than the lower limit 5a of the protection threshold $V_{TH2}$.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit of a programmable power supply, comprising:
   a current-sense circuit generating a current-sense signal in response to an output current of said programmable power supply;
   a voltage-sense circuit generating a voltage-sense signal in response to an output voltage of said programmable power supply;
   an output voltage regulation circuit coupled to regulate said output voltage of said programmable power supply according to a voltage reference signal and said voltage-sense signal; and
   an output current regulation circuit, coupled to regulate said output current of said programmable power supply according to a current reference signal and said current-sense signal,
   wherein said current reference signal is changed in response to a level of said output voltage of the programmable power supply, and said output current of said power supply is decreased in response to a decrement of said current reference signal, and
   wherein said output voltage of said programmable power supply is programmable.

2. The control circuit as claimed in claim 1 further comprising a time-delay circuit coupled to said output current regulation circuit for changing said current reference signal.

3. The control circuit as claimed in claim 1, wherein a level of said current reference signal is decreased in response to a decrement of said level of said output voltage of said programmable power supply.

4. The control circuit as claimed in claim 1, wherein a level of said current reference signal is decreased once said output voltage is lower than a protection threshold.

5. The control circuit as claimed in claim 4, wherein a level of said protection threshold is decreased in response to a decrement of said voltage reference signal.

6. A method of regulating a programmable power supply, comprising:
   generating a current-sense signal in response to an output current of said programmable power supply;
   generating a voltage-sense signal in response to an output voltage of said programmable power supply;
   regulating said output voltage in response to a voltage reference signal and said voltage-sense signal; and
   regulating said output current in response to a current reference signal and said current-sense signal,
   wherein said current reference signal is changed in response to said output voltage of said programmable power supply, and said output current is decreased in response to a decrement of said current reference signal, and
   wherein said output voltage of said programmable power supply is programmable.

7. The method as claimed in claim 6 further comprising generating a delay time to change said current reference signal.

8. The method as claimed in claim 6, wherein a level of said current reference signal is decreased in response to a decrement of said output voltage of said programmable power supply.

9. The method as claimed in claim 6, wherein a level of said current reference signal is decreased once said output voltage is lower than a protection threshold.

10. The method as claimed in claim 9, wherein a level of said protection threshold is decreased in response to a decrement of said voltage reference signal.

11. A method of under-voltage protection for a programmable power supply, comprises:
    regulating an output voltage of said power supply at a regulated level;
    regulating an output current of said programmable power supply approximately at a first current level whenever said output voltage is below said regulated level and higher than a lower limit of a protection threshold; and
    regulating said output current of said programmable power supply approximately at a second current level whenever said output voltage is below an upper limit of said protection threshold,
    wherein said output voltage of said programmable power supply is programmable.

12. The method as claimed in claim 11, said first current level is higher than said second current level.

13. The method as claimed in claim 11, said upper limit of said protection threshold is higher than said lower limit of said protection threshold.

* * * * *